US012787968B2

(12) United States Patent
Yoshinaga

(10) Patent No.: US 12,787,968 B2
(45) Date of Patent: Nov. 10, 2026

(54) WATER ABSORPTION TREATMENT MATERIAL AND METHOD FOR MANUFACTURING THE SAME

(71) Applicant: DAIKI Co., Ltd., Tokyo (JP)

(72) Inventor: Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 0 days.

(21) Appl. No.: 19/223,518

(22) Filed: May 30, 2025

(65) Prior Publication Data

US 2025/0287908 A1 Sep. 18, 2025

Related U.S. Application Data

(63) Continuation of application No. PCT/JP2023/040936, filed on Nov. 14, 2023.

(30) Foreign Application Priority Data

Dec. 20, 2022 (JP) ................................ 2022-202695

(51) Int. Cl.
*A01K 1/015* (2006.01)

(52) U.S. Cl.
CPC .......... *A01K 1/0155* (2013.01); *A01K 1/0154* (2013.01)

(58) Field of Classification Search
CPC ............................ A01K 1/0154; A01K 1/0155
See application file for complete search history.

(56) References Cited

U.S. PATENT DOCUMENTS 5,267,532 A * 12/1993 Franklin .............. A01K 1/0155 436/163
2017/0359967 A1* 12/2017 Tetrault .................... A41D 1/06

FOREIGN PATENT DOCUMENTS

| | | | | |
|---|---|---|---|---|
| GB | 2326581 | A | * 12/1998 | A01K 1/0154 |
| JP | 2001-321594 | A | 11/2001 | |
| JP | 2011-217664 | A | 11/2011 | |
| JP | 2017-153372 | A | 9/2017 | |
| WO | 2017/150065 | A1 | 9/2017 | |

OTHER PUBLICATIONS

Machine Translation of JP-2011217664-A, Mochizuki, Shotaro, Apr. 8, 2010 (Year: 2010).*
Machine Translation of WO-2017150065-A1, Yoshinaga, Junji, Sep. 8, 2017 (Year: 2017).*
Jan. 23, 2024 International Search Report issued in International Patent Application No. PCT/JP2023/040936.
Jan. 23, 2024 Written Opinion issued in International Patent Application No. PCT/JP2023/040936.

* cited by examiner

*Primary Examiner* — Kimberly S Berona
*Assistant Examiner* — Katherine June Walter
(74) *Attorney, Agent, or Firm* — Oliff PLC

(57) ABSTRACT

A water absorption treatment material absorbs liquid. The water absorption treatment material includes a grain that has a water absorbing property. The grain contains a water-absorbent polymer that discolors when absorbing the liquid.

11 Claims, 2 Drawing Sheets

WATER ABSORPTION TREATMENT MATERIAL AND METHOD FOR MANUFACTURING THE SAME

CROSS REFERENCE TO RELATED APPLICATION

This is a Continuation of International Application No. PCT/JP2023/040936 filed Nov. 14, 2023, which claims the benefit of Japanese Application No. 2022-202695 filed Dec. 20, 2022. The contents of these applications are hereby incorporated by reference in their entirety.

TECHNICAL FIELD

The present invention relates to a water absorption treatment material that absorbs liquid, and a method for manufacturing the same.

BACKGROUND ART

A conventional water absorption treatment material is disclosed, for example, in Patent Document 1. The water absorption treatment material disclosed in Patent Document 1 includes a plurality of grains that absorb liquid. Some of the plurality of grains have a granular core portion, and a coating portion that covers the core portion. The coating portion contains a coloring material that reacts with moisture, in addition to an adhesive material.

CITATION LIST

Patent Document

Patent Document 1: JP 2017-153372 A

SUMMARY OF INVENTION

Technical Problem

In the water absorption treatment material described above, the grains (grains having the coating portion) discolor when absorbing liquid. That makes it possible to visually distinguish between used grains and unused grains. However, there is a problem in that, over time after absorbing liquid, the coloring material dries up and the color of the grains after discoloration becomes less noticeable.

Solution to Problem

The present invention has been made in view of the above-described problem, and it is an object thereof to provide a water absorption treatment material in which the color of a grain after discoloration remains noticeable even after a period of time has passed, and a method for manufacturing the same.

A water absorption treatment material according to the present invention absorbs liquid, and includes a grain that has a water absorbing property, wherein the grain contains a water-absorbent polymer that discolors when absorbing the liquid.

In this water absorption treatment material, the grain is provided that contains the water-absorbent polymer that discolors when absorbing liquid. For this reason, the grain can discolor when absorbing liquid. Moreover, water-absorbent polymers have the property of retaining liquid for a long period of time. This makes it possible to maintain the color of the grain after discoloration for a long period of time.

A method for manufacturing a water absorption treatment material according to the present invention is a method for manufacturing a water absorption treatment material that absorbs liquid, and includes: a preparing step of preparing a water-absorbent polymer that discolors when absorbing the liquid; and a grain forming step of forming a grain that has a water absorbing property and contains the water-absorbent polymer.

In this manufacturing method, the grain is formed that contains the water-absorbent polymer that discolors when absorbing liquid. For this reason, the grain can discolor when absorbing liquid in a manufactured water absorption treatment material. Moreover, water-absorbent polymers have the property of retaining liquid for a long period of time. This makes it possible to maintain the color of the grain after discoloration for a long period of time.

Advantageous Effects of Invention

According to the present invention, it is possible to implement a water absorption treatment material in which the color of a grain after discoloration remains noticeable even after a period of time has passed, and a method for manufacturing the same.

DESCRIPTION OF EMBODIMENTS

Figure 1:
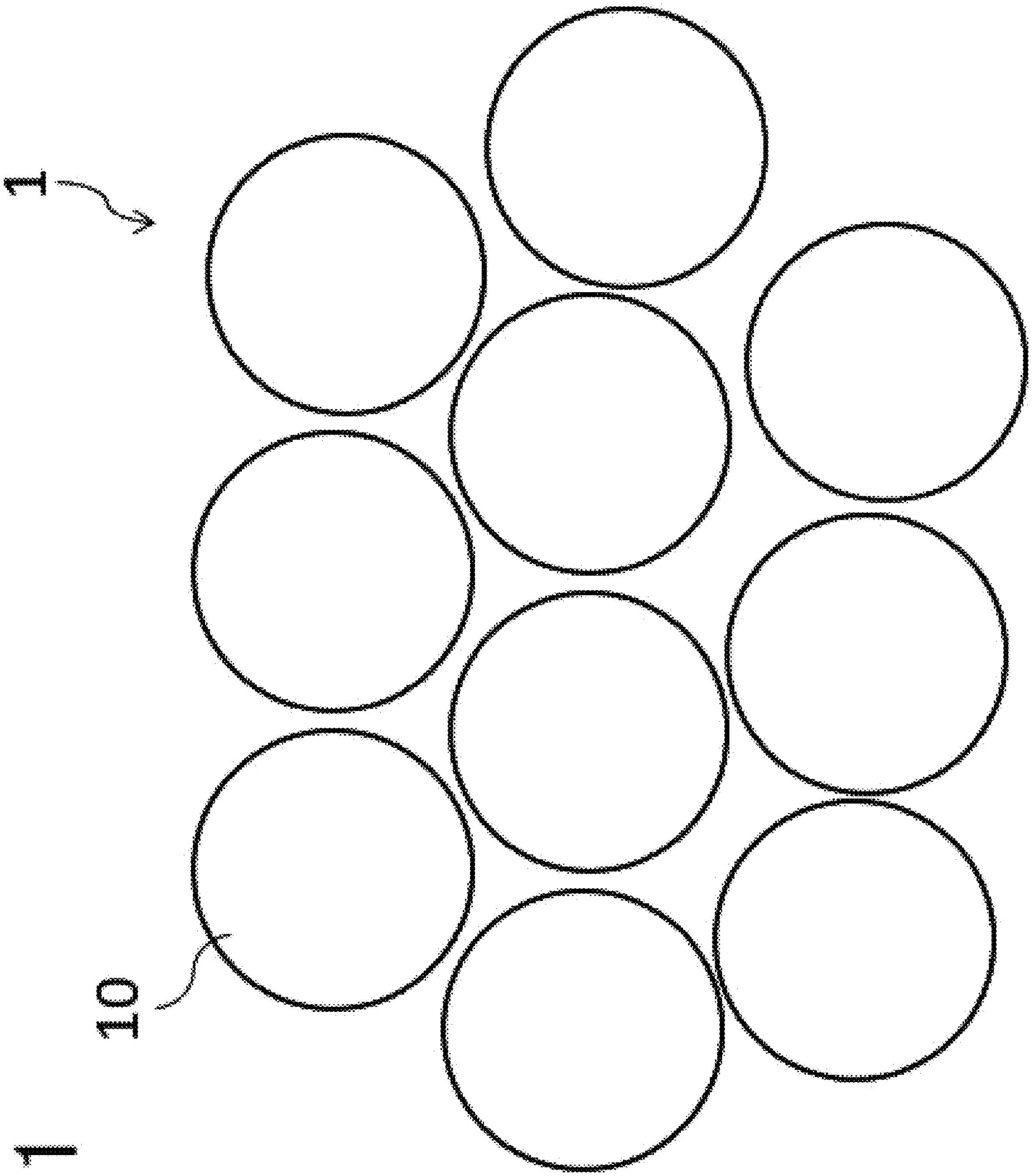
FIG. 1 is a schematic view showing an embodiment of a water absorption treatment material according to the present invention.

Hereinafter, an embodiment of the present invention will be described in detail with reference to the drawings. In the description of the drawings, the same elements are given the same reference numerals, and a redundant description will be omitted.

FIG. 1 is a schematic view showing an embodiment of a water absorption treatment material according to the present invention. A water absorption treatment material 1 is a water absorption treatment material that absorbs liquid to be treated. The water absorption treatment material 1 is an excrement treatment material that absorbs excrement (mainly urine). The excrement treatment material may be an animal excrement treatment material that absorbs excrement of animals such as cats or dogs, or may be a human excrement treatment material that absorbs excrement of humans. The water absorption treatment material 1 includes a plurality of grains 10. The water absorption treatment material 1 is used, for example, in a state in which the plurality of grains 10 are laid in a box-shaped toilet.

Each grain 10 has a water absorbing property, and treats liquid by absorbing the liquid. That is, each grain 10 takes the liquid in the inside thereof and retains it. The grains 10 having the water absorbing property require the water absorption rate of 40% or more measured by the following test. First, approximate 50 grams of the grains 10 (sample) are placed in a sieve with the inner diameter of 10 cm and the mesh size of 1 mm. An empty beaker is set under the sieve. Then, 30 ml of water is dripped on the sample over 10 seconds using a syringe with the inner diameter of its outer cylinder of 3 cm and the inner diameter of its cylinder tip of 4 mm (60 ml syringe manufactured by Terumo Corp.). After waiting 1 minute, the quantity of the water in the beaker is measured. The ratio of the value obtained by subtracting the measured water quantity from the quantity of the dripped water (30 ml) with respect to the quantity of the dripped water shall be the water absorption rate. That is, if the water quantity in the beaker is 18 ml or less, the water absorption rate is 40% or more, and therefore the grains 10 are found to have the water absorbing property.

Each grain 10 has a granular shape. Examples of the granular shape include a sphere, column, and ellipsoid. The particle diameter of each grain 10 is, for example, between 5 mm and 30 mm inclusive. As used herein, the particle diameter of the grain 10 is defined as the diameter of the minimum sphere that can include the grain 10. It is preferable that each grain 10 contains an organic substance as its main material. As used herein, the main material of the grain 10 refers to the material that accounts for the highest weight ratio in the grain 10, out of one or more materials constituting the grain 10. Each grain 10 may be made only of an organic substance, or may be made of an organic substance and an inorganic substance.

Figure 2:
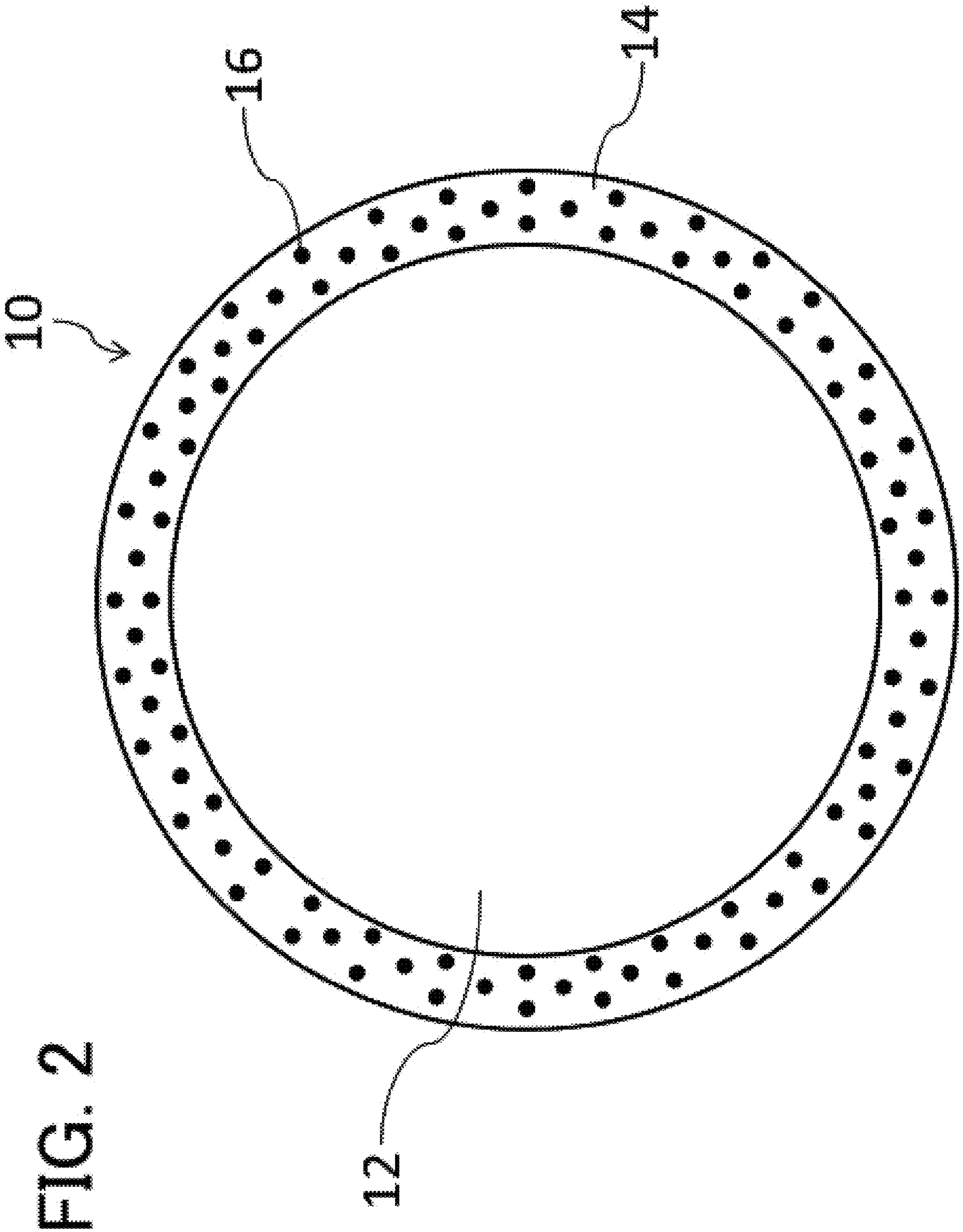
FIG. 2 is a schematic view showing a grain 10.

FIG. 2 is a schematic view showing the grain 10. Each grain 10 has a core portion 12, and a coating portion 14. The core portion 12 has a granular shape. In detail, the core portion 12 is a granule formed in a granular shape. The core portion 12 has a function of absorbing and retaining liquid. The core portion 12 contains a water-absorbent material. The core portion 12 contains the water-absorbent material as its main material. As used herein, the main material of the core portion 12 refers to the material that accounts for the highest weight ratio in the core portion 12, out of one or more materials constituting the core portion 12 (core portion material). The core portion 12 may be made only of the water-absorbent material, or may be made of the water-absorbent material and another material. It is preferable that the water-absorbent material is an organic substance. Examples of the water-absorbent material that is an organic substance include papers, plants, plastics, and organic sludge.

The papers refer to a material made mainly of pulp. As the papers, in addition to ordinary paper (paper powder), for example, fluff pulp, paper derived from vinyl chloride wallpaper (paper generated during manufacturing or classifying vinyl chloride wallpaper), paper derived from a gypsum board (paper generated during manufacturing or classifying a gypsum board), or paper derived from a sanitary article (paper generated during manufacturing or classifying a sanitary article that contains paper) can be used. Examples of the sanitary article containing paper include paper diapers, sanitary napkins, urine absorbing pads, and sanitary paper (tissue paper, toilet paper, paper towels, or the like). As the plants, for example, wood powder, sawdust, or a plant residue (used tea leaves, bean curd lees, or the like) can be used. As the plastics, in addition to ordinary plastic, for example, plastic derived from vinyl chloride wallpaper (plastic generated during manufacturing or classifying vinyl chloride wallpaper), or plastic derived from a sanitary article (plastic generated during manufacturing or classifying a sanitary article that contains plastic) can be used. Examples of the sanitary article containing plastic include paper diapers, sanitary napkins, urine absorbing pads, and sanitary masks. As the organic sludge, for example, papermaking sludge, or pulp sludge can be used.

The coating portion 14 covers the core portion 12. The coating portion 14 may cover the entirety or a part of the surface of each core portion 12. The coating portion 14 contains an adhesive material, and has a function (agglomeration forming function) of bonding the grains 10 that have absorbed liquid to agglomerate them when in use. The coating portion 14 also contains a water-absorbent material as its main material. As used herein, the main material of the coating portion 14 refers to the material that accounts for the highest weight ratio in the coating portion 14, out of one or more materials constituting the coating portion 14 (coating material). It is preferable that the water-absorbent material contained in the coating portion 14 is also an organic substance.

The grain 10 contains a water-absorbent polymer 16. The water-absorbent polymer 16 is configured to discolor when absorbing liquid. As used herein, "discoloration" is not limited to a case where the hue of the water-absorbent polymer 16 changes before and after absorbing liquid, but also includes a case where the shade of the same hue changes, for example, from light blue to dark blue. Also, "discoloration" includes a case where a colored area in the water-absorbent polymer 16 changes (for example, a case where an area that was not colored before absorbing liquid becomes colored after absorbing the liquid).

The water-absorbent polymer 16 contains a coloring material that reacts with moisture. The coloring material reacts with moisture to exhibit a predetermined color (e.g. blue, red, green, or the like). That causes the water-absorbent polymer 16 to discolor to that color. The coloring material is contained in the grain 10 in a state of being supported by the water-absorbent polymer 16, and is not contained directly in any part of the grain 10 other than the water-absorbent polymer 16. The weight ratio of the coloring material with respect to the water-absorbent polymer 16 is preferably between 1% and 10% inclusive. As the coloring material, for example, a dye or a pigment can be used. The weight ratio of the water-absorbent polymer 16 with respect to the grain 10 is preferably between 1% and 10% inclusive.

In the present embodiment, the water-absorbent polymer 16 is contained only in the coating portion 14, out of the core portion 12 and the coating portion 14. The water-absorbent polymer 16 corresponds to the adhesive material described above. For the water-absorbent polymer 16, for example, an acrylic water-absorbent polymer such as sodium polyacrylate can be used. The grain 10 may or may not contain an ordinary water-absorbent polymer (a water-absorbent polymer that does not discolor even when absorbing liquid), in addition to the water-absorbent polymer 16. Also, the grain 10 may or may not contain an adhesive material other than a water-absorbent polymer (the water-absorbent polymer 16, or the ordinary water-absorbent polymer). Examples of the adhesive material include starch, CMC (carboxymethyl cellulose), PVA (polyvinyl alcohol), and dextrin.

Next, an example of a method for manufacturing the water absorption treatment material 1 will be described as an embodiment of a method for manufacturing a water absorption treatment material according to the present invention. This manufacturing method includes a preparing step, and a grain forming step.

The preparing step is a step of preparing the water-absorbent polymer 16. In the preparing step, the water-absorbent polymer 16 may be formed by making an ordinary water-absorbent polymer contain a coloring material, or a water-absorbent polymer that contains a coloring material in advance may be procured as the water-absorbent polymer 16.

The grain forming step is a step of forming the grain 10. The grain forming step includes a core portion forming step, and a coating portion forming step. The core portion forming step is a step of forming the core portion 12. In the core portion forming step, a plurality of granules that will serve as the core portions 12 are formed by granulating the core portion material with a granulation apparatus. As the granulation apparatus, for example, an extrusion granulator can be used. Prior to the granulation, pretreatment such as pulverization, kneading, and adding water is performed on the core portion material as needed.

The coating portion forming step is a step of forming the coating portion 14. In the coating portion forming step, the coating portion 14 is formed by attaching the powdery coating material to the surface of each core portion 12 with a coating apparatus or the like. The coating material contains the water-absorbent polymer 16 prepared in the preparing step. The coating material can be attached by, for example, sprinkling or spraying. After that, posttreatment such as sieving (sizing), and drying is performed as needed. Accordingly, the water absorption treatment material 1 composed of the plurality of grains 10 is obtained.

The effects of the present embodiment will be described. In the present embodiment, the grain 10 is formed that contains the water-absorbent polymer 16 that discolors when absorbing liquid. For this reason, the grain 10 can discolor when absorbing liquid in the water absorption treatment material 1. Moreover, water-absorbent polymers have the property of retaining liquid for a long period of time. This makes it possible to maintain the color of the grain 10 after discoloration for a long period of time. Accordingly, the water absorption treatment material 1 in which the color of the grain 10 after discoloration remains noticeable even after a period of time has passed, and the method for manufacturing the same are implemented.

Enlarging the amount of the water-absorbent polymer 16 contained makes it easier to visually recognize discoloration of the grains 10. From this viewpoint, the weight ratio of the water-absorbent polymer 16 with respect to the grain 10 is preferably 1% or more. On the other hand, enlarging the amount of the water-absorbent polymer 16 contained leads to an increase in the manufacturing cost of the water absorption treatment material 1. From this viewpoint, the weight ratio is preferably 10% or less.

Each grain 10 has the core portion 12 and the coating portion 14. In this case, different functions can be assigned to the core portion 12 and the coating portion 14. In fact, in the present embodiment, the water absorbing and retaining function is assigned mainly to the core portion 12, and the agglomeration forming function is assigned to the coating portion 14.

The water-absorbent polymer 16 is contained only in the coating portion 14, out of the core portion 12 and the coating portion 14. By not providing the water-absorbent polymer 16 in the core portion 12 which is difficult to visually recognize from the outside of the grain 10 in this way, the amount of the water-absorbent polymer 16 used can be saved.

The water-absorbent polymer 16 contains the coloring material that reacts with moisture. Thus, the water-absorbent polymer 16 that discolors when absorbing liquid can be easily realized.

Enlarging the amount of the coloring material contained makes it easier to visually recognize discoloration of the water-absorbent polymer 16. From this viewpoint, the weight ratio of the coloring material with respect to the water-absorbent polymer 16 is preferably 1% or more. On the other hand, enlarging the amount of the coloring material contained leads to an increase in the manufacturing cost of the water absorption treatment material 1. From this viewpoint, the weight ratio is preferably 10% or less.

In the case where a dye is used as the coloring material, the coloring material that easily reacts with moisture can be easily realized.

In the case where each grain 10 contains an organic substance as its main material, it is possible to obtain the grains 10 suitable for being disposed of by incineration. This contributes to convenience of disposal of the used grains 10. Particularly in the case where each grain 10 is made only of an organic substance, it is possible to obtain the grains 10 more suitable for being disposed of by incineration.

In the case where the water absorption treatment material 1 is an excrement treatment material that absorbs animal excrement, an animal sometimes excretes on the water absorption treatment material 1 when the user (the owner of the animal or the like) is not looking. In this case, the user usually notices that fact some time after the excretion. For this reason, the water absorption treatment material 1 in which the color of the grain 10 after discoloration remains noticeable even after a period of time has passed is particularly useful.

The present invention is not limited to the above-described embodiment, and various modifications can be made. In the above-described embodiment, an example is given in which the water-absorbent polymer 16 contains only one type of coloring material. However, the water-absorbent polymer 16 may contain two or more types of coloring materials. For example, the coloring materials may include a first coloring material that reacts with moisture to exhibit a first color, and a second coloring material that reacts with moisture to exhibit a second color different from the first color. The first and second colors have mutually different hues. In the case where the water-absorbent polymer 16 contains the first and second coloring materials in this way, the water-absorbent polymer 16 that has absorbed liquid can exhibit a mixed color of the first and second colors. For example, in a case where the first and second colors are, respectively, blue and red, the mixed color of them is purple. Thus, the water-absorbent polymer 16, the hue of which changes before and after absorbing liquid, can be easily realized.

In the above-described embodiment, an example is given in which each grain 10 has multi-layer structure (double-layer structure) composed of the core portion 12 and the coating portion 14. However, it is not essential to provide the coating portion 14. That is, each grain 10 may have single-layer structure composed only of an uncovered granule (core portion 12). In that case, the manufacturing cost of the water absorption treatment material 1 can be reduced, because the coating material is not required.

In the above-described embodiment, an example is given in which the water absorption treatment material 1 is an excrement treatment material. However, the water absorption treatment material 1 may be a vomited matter treatment material that absorbs vomited matter, or a food waste treatment material that absorbs food waste (moisture contained in the food waste).

LIST OF REFERENCE NUMERALS

1 Water Absorption Treatment Material
10 Grain
12 Core Portion
14 Coating Portion
16 Water-absorbent Polymer

The invention claimed is:

1. A water absorption treatment material that absorbs liquid comprising:

a grain that has a water absorbing property, wherein the grain contains a water-absorbent polymer, and the water-absorbent polymer discolors when absorbing the liquid.

2. The water absorption treatment material according to claim 1, wherein a weight ratio of the water-absorbent polymer with respect to the grain is between 1% and 10% inclusive.

3. The water absorption treatment material according to claim 1, wherein the grain have a granular core portion, and a coating portion that covers the core portion.

4. The water absorption treatment material according to claim 3, wherein the water-absorbent polymer is contained only in the coating portion, out of the core portion and the coating portion.

5. The water absorption treatment material according to claim 1, wherein the water-absorbent polymer contains a coloring material that reacts with moisture.

6. The water absorption treatment material according to claim 5, wherein the coloring material includes a first coloring material that reacts with moisture to exhibit a first color, and a second coloring material that reacts with moisture to exhibit a second color different from the first color.

7. The water absorption treatment material according to claim 5, wherein a weight ratio of the coloring material with respect to the water-absorbent polymer is between 1% and 10% inclusive.

8. The water absorption treatment material according to claim 5, wherein the coloring material is a dye.

9. The water absorption treatment material according to claim 1, wherein the grain contains an organic substance as a main material.

10. The water absorption treatment material according to claim 9, wherein the grain is made only of an organic substance.

11. The water absorption treatment material according to claim 1, wherein the water absorption treatment material is an excrement treatment material that absorbs animal excrement.

* * * * *